Patented Nov. 15, 1927.

1,649,270

UNITED STATES PATENT OFFICE.

GUY VAN SCOYOC, OF SALT LAKE CITY, UTAH, AND HENRY L. WEHRBEIN AND HORACE A. SHONLE, OF INDIANAPOLIS, INDIANA; SAID SHONLE ASSIGNOR TO ELI LILLY AND COMPANY, OF INDIANAPOLIS, INDIANA, A CORPORATION OF INDIANA.

CALCIUM-SUGAR PREPARATION.

No Drawing.   Application filed May 1, 1924. Serial No. 710,434.

In the co-pending application of two of us, Van Scoyoc and Wehrbein, Serial No. 710,433, of even filing date herewith, there is disclosed a product of calcium with certain partial-degradation products of sugar, and a method of treatment of disease by the formation of that product and the intravenous injection thereof before further degradation of the sugar occurs. As that process was originally worked out by Van Scoyoc and Wehrbein, it involved the production of the degradation to the desired point by the physician, and the substantially immediate use of the product when the degradation had proceeded to the desired point; as in the presence of the calcium the degradation of the sugar was progressive and continuous, and the partial-degradation products of the sugar could not be maintained at the desired point of degradation for injection.

It is the object of our present invention to make it possible to prepare these partial-degradation products of sugar as long in advance as desired, and preserve them at the desired point of degradation, for dispensing directly in that condition; so that the physician using them is relieved of the necessity of producing the partial-degradation himself, and of the responsibility of determining when the desired point of sugar-degradation is reached. In this way, in partial-degradation product of the sugar may be prepared in the laboratory, with much greater accuracy and uniformity than physicians can possibly attain; and the material may be kept in stock, dispensed as needed, and used as occasion requires without necessity for careful determination by the physician of an intermediate point of a progressive chemical reaction.

In carrying out our invention, speaking generally, we mix the sugar, desirably dextrose, with calcium hydroxide, in water; as set forth in the aforesaid Van Scoyoc and Wehrbein application. The sugar may be any sugar containing a free aldehyde or ketone group, and especially a hexose; but dextrose is the most desirable sugar. Upon this mixing, the degradation of the sugar starts as set forth in said Van Scoyoc and Wehrbein application, and may be accelerated by heating. We allow this to continue until the desired point of sugar-degradation has been reached, as in the aforesaid application of Van Scoyoc and Wehrbein; which point we determine as hereinafter explained. Then, however, instead of using the product immediately for intravenous injection, we stop the degradation, and prepare the product for keeping in stock, and dispensing and using when needed.

To stop the degradation at the desired point, we separate the calcium from the sugar and its degradation products when that point has been reached. The calcium may be separated and removed by any suitable precipitant, such as oxalic acid or sulphuric acid, which causes the calcium to be thrown down quantitatively as calcium oxalate or calcium sulphate. We put the remaining solution up in bottles, and stock it for dispensing as needed.

This solution, however, is not sufficient for the desired treatment where calcium is indicated, as it contains no calcium. Therefore, we prepare a separate solution containing calcium hydroxide, which is put up in bottles or ampoules separately from the aforesaid solution of sugar and its partial-degradation products. The physician adds this solution containing calcium hydroxide to the solution of the sugar and its partial-degradation products when he is ready to make the intravenous injection, and the resultant solution is immediately ready for such injection, with the benefits of the product set forth in the aforesaid Van Scoyoc and Wehrbein application. Thus the physician need not concern himself with any chemical reaction, or with any determination (as by color) of the proper point of partial-degradation of the sugar; but needs merely to mix the two solutions and proceed at once with his treatment by intravenous injection.

The solution containing calcium hydroxide may be of various forms; but we find it advantageous to have a high calcium-hydroxide concentration of such solution, as may be obtained if such solution is also a water solution of a suitable sugar. Of course, the sugar used for such water solution must be one which is not affected by the calcium, and therefore cannot be dextrose or its companion hexoses, or any sugar containing a free aldehyde or ketone group. A suitable sugar for a permanent solution containing calcium hydroxide is sucrose. This solution containing calcium hydroxide is conveniently made by adding sucrose to a suspension of calcium hydroxide in water, desirably so that 15 cc. of the final solution contains approximately 1 gram of calcium hydroxide. This sucrose solution of calcium hydroxide is conveniently put up in ampoules, containing quantities to suit those in the bottles of the solution of dextrose and its degradation products; the quantities being such that the molecular amount of the original dextrose exceeds that of the calcium hydroxide. For this, there should be at least two and one-half parts by weight, of the original dextrose (used for forming the solution of dextrose and its degradation products) for each part of calcium hydroxide in the sucrose solution; and desirably from two to six times that much dextrose.

In proceeding with the degradation of dextrose we prepare a water suspension of calcium hydroxide and add the dextrose. We have found it convenient, though not necessary, to use a solution containing 1500 cc. of water, 750 g. of dextrose, and 50 g. of calcium oxide. We can use a much lower quantity of dextrose, if we wish; but we should have at least 200 g. to 250 g. of dextrose for each 50 g. of calcium oxide, in order to get complete solution of the calcium hydroxide.

After getting this water solution containing dextrose and calcium hydroxide, we may let it stand until the desired degradation occurs. We prefer, however, to accelerate the degradation by heat, but the temperature should not be raised to the boiling point. Whether we heat the solution or not, we let the degradation of the sugar proceed to a fairly definite point. We determine this point by phenolphthalein titration, until the alkalinity of the solution has been reduced to less than 50% of the alkalinity of the original solution of dextrose and calcium hydroxide, and desirably between 10% and 35% thereof.

When the desired alkalinity is reached, and very promptly at that point if the degradation is being carried on with heat, the calcium is precipitated, as by adding either oxalic acid or sulphuric acid. The oxalic acid may be added in powder form or concentrated water solution. The sulphuric acid may be added either concentrated or dilute, but desirably fairly concentrated to keep down volume. The amount of precipitant added is carefully made very slightly less than the corresponding molecular amount of calcium, so that the resultant solution will contain no free sulphuric or oxalic acid.

The precipitate of calcium oxalate or calcium sulphate is suitably separated from the solution, as by filtration. The remaining solution of dextrose and its degradation products is then suitably sterilized, preferably in a Berkefeld filter, and is then bottled in convenient quantities. This solution may be stocked; and when it is desired for use, it is mixed with the contents of the corresponding ampoule containing the sucrose solution of calcium hydroxide, and the intravenous injection is made.

While we have described the partial degradation of the sugar as being obtained by calcium hydroxide, and the removal of the calcium at the desired point in the degradation process, we may obtain such degradation by hydroxides of other metals of the calcium groups, such as barium and strontium, which may be removed in the same way by precipitation with sulphuric or oxalic acid.

We claim as our invention:—

1. A medicinal preparation comprising two components which are kept separate substantially until the preparation is to be used; one of said components comprising calcium hydroxide dissolved in a water solution of a sugar which is not degraded by the presence of calcium; and the other component comprising a solution of a sugar having a free aldehyde or ketone group, which sugar has been partially degraded in the presence of calcium hydroxide, and the calcium has been removed from the solution when the alkalinity of such solution has been decreased to less than fifty percent of the original alkalinity.

2. A medicinal preparation comprising two components as set forth in claim 1, with the addition that the sugar in the second component is a hexose.

3. A medicinal preparation comprising two components as set forth in claim 1, with the addition that the sugar in the second component is dextrose.

4. A medicinal preparation comprising two components which are kept separate substantially until the preparation is to be used; one of said components comprising calcium hydroxide; and the other component comprising a solution of a sugar having a free aldehyde or ketone group, which sugar has been partially degraded in the presence of calcium hydroxide, and the calcium has been removed from the solution when the alkalinity of such solution has been decreased to less than fifty percent of the original alkalinity.

5. A medicinal preparation comprising two components as set forth in claim 4, with the addition that the sugar in the second component is a hexose.

6. A medicinal preparation comprising two components as set forth in claim 4, with the addition that the sugar in the second component is dextrose.

7. A medicinal preparation comprising two components which are kept separate substantially until the preparation is to be used; one of said components comprising calcium hydroxide; and the other component comprising a solution of a sugar having a free aldehyde or ketone group, which sugar has been partially degraded in the presence of calcium hydroxide, and the calcium has been removed from the solution before such degradation is complete.

8. A medicinal preparation comprising two components as set forth in claim 7, with the addition that the sugar in the second component is a hexose.

9. A medicinal preparation comprising two components, as set forth in claim 7, with the addition that the sugar in the second component is dextrose.

10. A medicinal preparation comprising two components which are kept separate substantially until the preparation is to be used; one of said components comprising calcium hydroxide; and the other component comprising a solution of a sugar having a free aldehyde or ketone group, which sugar has been partially degraded in the presence of a hydroxide of a metal of the calcium group, and such metal has been removed from the solution before such degradation is complete.

11. A medicinal preparation comprising two components as set forth in claim 10, with the addition that the sugar in the second component is a hexose.

12. A medicinal preparation comprising two components, as set forth in claim 10, with the addition that the sugar in the second component is dextrose.

13. A medicinal preparation comprising two components which are kept separate substantially until the preparation is to be used; one of said components comprising a solution of calcium hydroxide and sucrose and the other component comprising a solution of a sugar having a free aldehyde or ketone group, which sugar has been partially degraded in the presence of the hydroxide of a metal of the calcium group, and such metal has been removed from the solution before such degradation is complete.

14. A medicinal preparation comprising two components, as set forth in claim 13, with the addition that the sugar in the second component is a hexose.

15. A medicinal preparation comprising two components, as set forth in claim 13, with the addition that the sugar in the second component is dextrose.

16. The method of preparing a product of calcium with partial-degradation products of a sugar having a free aldehyde or ketone group, comprising forming a solution containing calcium hydroxide and said sugar, permitting degradation to proceed to an intermediate point, removing the calcium from the solution when such degradation has reached such intermediate point, and just prior to use of the preparation adding calcium hydroxide to such solution from which calcium had previously been removed.

17. The method of preparing a medicinal preparation containing calcium as set forth in claim 16, with the addition that the sugar used is a hexose.

18. The method of preparing a medicinal preparation containing calcium as set forth in claim 16, with the addition that the sugar used is dextrose.

19. The method of preparing a medicinal preparation containing calcium as set forth in claim 16, with the addition that the calcium hydroxide in the last addition is in a solution of a sugar which it does not degrade.

20. The method of preparing a medicinal preparation containing calcium as set forth in claim 16, with the addition that the sugar used is a hexose, and that the calcium hydroxide in the last addition is in a solution of a sugar which it does not degrade.

21. The method of preparing a medicinal preparation containing calcium as set forth in claim 16, with the addition that the sugar used is dextrose, and that the calcium hydroxide in the last addition is in a solution of a sugar which it does not degrade.

22. The method of preparing a product of calcium with partial-degradation products of a sugar having a free aldehyde or ketone group, comprising forming a solution containing said sugar and the hydroxide of a metal of the calcium group, permitting degradation to proceed to an intermediate point, removing such metal from the solution when such degradation has reached such intermediate point, and just prior to use of the preparation adding calcium hydroxide to such solution from which such metal had previously been removed.

23. The method of preparing a medicinal preparation containing calcium as set forth in claim 22, with the addition that the sugar used is a hexose.

24. The method of preparing a medicinal preparation containing calcium as set forth in claim 22, with the addition that the sugar used is dextrose.

25. The method of preparing a product of calcium with partial-degradation products of a sugar having a free aldehyde or ketone group, comprising forming a solution containing said sugar and the hydroxide of a metal of the calcium group, permitting degradation to proceed to an intermediate point, removing such metal from the solution when such degradation has reached such intermediate point, and just prior to use of the preparation adding a solution of calcium hydroxide and sucrose to such solution from which such metal has previously been removed.

26. The method of preparing a medicinal preparation containing calcium as set forth in claim 25, with the addition that the sugar used is a hexose.

27. The method of preparing a medicinal preparation containing calcium as set forth in claim 25, with the addition that the sugar used is dextrose.

In witness whereof, I, GUY VAN SCOYOC, have hereunto set my hand at Salt Lake City, Utah, this 23rd day of April, 1924.

GUY VAN SCOYOC.

In witness whereof, we, HENRY L. WEHRBEIN and HORACE A. SHONLE, have hereunto set our hands at Indianapolis, Indiana, this 29th day of April, 1924.

HENRY L. WEHRBEIN.
HORACE A. SHONLE.

26. The method of preparing a medicinal preparation containing calcium as set forth in claim 25, with the addition that the sugar used is a hexose.

27. The method of preparing a medicinal preparation containing calcium as set forth in claim 25, with the addition that the sugar used is dextrose.

In witness whereof, I, GUY VAN SCOYOC, have hereunto set my hand at Salt Lake City, Utah, this 23rd day of April, 1924.

GUY VAN SCOYOC.

In witness whereof, we, HENRY L. WEHRBEIN and HORACE A. SHONLE, have hereunto set our hands at Indianapolis, Indiana, this 29th day of April, 1924.

HENRY L. WEHRBEIN.
HORACE A. SHONLE.

Certificate of Correction.

Patent No. 1,649,270.    Granted November 15, 1927, to
GUY VAN SCOYOC ET AL.

It is hereby certified that error appears in the printed specification of the above-numbered patent requiring correction as follows: Page 1, line 31, for the word "in," second occurrence, read *the;* and that the said Letters Patent should be read with this correction therein that the same may conform to the record of the case in the Patent Office.

Signed and sealed this 13th day of December, A. D. 1927.

[SEAL.]
M. J. MOORE,
*Acting Commissioner of Patents.*

Certificate of Correction.

Patent No. 1,649,270.   Granted November 15, 1927, to

GUY VAN SCOYOC ET AL.

It is hereby certified that error appears in the printed specification of the above-numbered patent requiring correction as follows: Page 1, line 31, for the word "in," second occurrence, read *the;* and that the said Letters Patent should be read with this correction therein that the same may conform to the record of the case in the Patent Office.

Signed and sealed this 13th day of December, A. D. 1927.

[SEAL.]

M. J. MOORE,
*Acting Commissioner of Patents.*